US009276884B2

(12) United States Patent
Churchill et al.

(10) Patent No.: US 9,276,884 B2
(45) Date of Patent: Mar. 1, 2016

(54) INTELLIGENT NOTIFICATION SYSTEM AND METHOD

(71) Applicant: Aquila Vision Corporation, Missoula, MT (US)

(72) Inventors: Lynn D. Churchill, Missoula, MT (US); Charles Eubank, Jr., Missoula, MT (US); Joseph Kimmey, Arlee, MT (US)

(73) Assignee: Aquila Vision Corporation, Missoula, MT (US)

( * ) Notice: Subject to any disclaimer, the term of this patent is extended or adjusted under 35 U.S.C. 154(b) by 0 days.

(21) Appl. No.: 14/156,323

(22) Filed: Jan. 15, 2014

(65) Prior Publication Data

US 2014/0136609 A1  May 15, 2014

Related U.S. Application Data

(63) Continuation-in-part of application No. 11/823,494, filed on Jun. 29, 2007, now abandoned.

(51) Int. Cl.
  *G06F 17/30* (2006.01)
  *H04L 12/58* (2006.01)
  *G06Q 10/10* (2012.01)
(52) U.S. Cl.
  CPC ............ *H04L 51/046* (2013.01); *G06Q 10/10* (2013.01)
(58) Field of Classification Search
  CPC combination set(s) only.
  See application file for complete search history.

(56) References Cited

U.S. PATENT DOCUMENTS

| 4,774,658 | A  | 9/1988  | Lewin |
| 5,260,986 | A  | 11/1993 | Pershan |
| 6,014,080 | A  | 1/2000  | Layson, Jr. |
| 6,072,396 | A  | 6/2000  | Gaukel |
| 6,100,806 | A  | 8/2000  | Gaukel |
| 6,337,665 | B1 | 1/2002  | Gaukel |
| 6,535,582 | B1 | 3/2003  | Harris |
| 6,646,617 | B1 | 11/2003 | Gaukel |
| 6,774,799 | B2 | 8/2004  | Defant et al. |
| 6,816,878 | B1 | 11/2004 | Zimmers et al. |
| 7,085,359 | B2 | 8/2006  | Crites et al. |
| 7,119,695 | B2 | 10/2006 | Defant et al. |
| 7,123,141 | B2 | 10/2006 | Contestabile |
| 7,181,493 | B2 | 2/2007  | English et al. |
| 7,233,781 | B2 | 6/2007  | Hunter et al. |
| 7,406,507 | B2 | 7/2008  | Piccioni |
| 7,518,500 | B2 | 4/2009  | Aninye et al. |
| 7,522,060 | B1 | 4/2009  | Tumperi et al. |
| 7,808,378 | B2 | 10/2010 | Hayden |
| 7,864,047 | B2 | 1/2011  | Aninye et al. |
| 8,013,736 | B2 | 9/2011  | Derrick et al. |
| 8,045,954 | B2 | 10/2011 | Barbeau et al. |
| 8,150,925 | B2 | 4/2012  | Zimmers et al. |

(Continued)

OTHER PUBLICATIONS

Air-Trak, XConnect Optional Features, 1 web page, http://public.air-trak.com/solutions/xconnect-optional, downloaded: Nov. 11, 2011.

(Continued)

*Primary Examiner* — Diane Mizrahi
(74) *Attorney, Agent, or Firm* — Paul C. Oestreich; Eminent IP, P.C.

(57) ABSTRACT

An intelligent notification system configured for receiving and processing any suitable input message, determining whether or not an output notification should be sent and for sending such output notifications with the appropriate information to the appropriate parties according to predetermined business rules.

20 Claims, 4 Drawing Sheets

(56) References Cited

U.S. PATENT DOCUMENTS

| | | |
|---|---|---|
| 8,364,197 B2 | 1/2013 | Binning |
| 8,412,147 B2 | 4/2013 | Hunter et al. |
| 8,478,225 B2 | 7/2013 | Sennett et al. |
| 8,526,909 B2 | 9/2013 | Sennett et al. |
| 8,531,294 B2 | 9/2013 | Slavin et al. |
| RE44,535 E | 10/2013 | Zimmers et al. |
| 2002/0024443 A1 | 2/2002 | Hawkins et al. |
| 2003/0131069 A1* | 7/2003 | Lucovsky et al. ............ 709/217 |
| 2005/0273692 A1* | 12/2005 | Horvitz et al. ............... 715/500 |
| 2005/0278366 A1* | 12/2005 | Horvitz et al. ............... 707/100 |
| 2009/0008450 A1 | 1/2009 | Ebert et al. |
| 2010/0281405 A1 | 11/2010 | Whattam |
| 2011/0098017 A1 | 4/2011 | Berry et al. |
| 2013/0222133 A1 | 8/2013 | Schultz et al. |
| 2013/0241726 A1 | 9/2013 | Hunter et al. |
| 2013/0328679 A1 | 12/2013 | Sennett et al. |
| 2013/0346302 A1* | 12/2013 | Purves et al. .................. 705/40 |
| 2014/0187213 A1* | 7/2014 | Shuster et al. ............. 455/414.1 |
| 2014/0188541 A1* | 7/2014 | Goldsmith et al. .......... 705/7.19 |

OTHER PUBLICATIONS

Air-Trak, XConnect Standard Features, 2 web pages, http://public.air-trak.com/solutions/xconnect-standard, downloaded: Nov. 11, 2011.

Air-Trak, XConnect, web pages, http://public.air-trak.com/solutions/xconnect, 2 pages, downloaded: Nov. 11, 2011.

ElmoTech, Integrated Monitoring Platform Brochure, 2 pages, downloaded: Nov. 11, 2011.

ElmoTech, Management Tools, 1 web page, http://www.elmotech.com/default.asp?PageID=36, downloaded: Nov. 11, 2011.

iSecureTrac Systems & Services, EM Management Software, 3 web pages, http://www.isecuretrac.com/Services.aspx?p=EMManagement, downloaded: Nov. 11, 2011.

* cited by examiner

INTELLIGENT NOTIFICATION SYSTEM AND METHOD

CROSS-REFERENCE TO RELATED APPLICATIONS

This continuation-in-part patent application claims benefit and priority to the filing of U.S. patent application Ser. No. 11/823,494 filed on Jun. 29, 2007, titled "OFFENDER TRANSPORT TRACKING AND EMERGENCY RESPONSE (OTTER) SYSTEM", pending, the contents of which are incorporated by reference as if fully set forth herein.

BACKGROUND OF THE INVENTION

1. Field of the Invention

This invention relates generally to automated response systems. More particularly, this invention relates to automated response systems that provide preconfigured responses based on variable inputs. Still more particularly, the invention relates to an intelligent notification system and method.

2. Description of Related Art

Emergency response and alert systems that can be activated in the event of an emergency, e.g., medical, security, accident, fire, public safety, etc., are well known. For example, US RE44,535 to Zimmers et al. discloses an alert notification system for providing alert notifications to multiple persons or to a plurality of related geographic locations. The alerts of the Zimmers et al. system may be initiated by authorized personnel via telephone or Internet interaction with the system, or may be generated automatically from data feeds such as the Emergency Managers Weather Information Network (EM-WIN) system of the National Weather Service and then delivers the alerts via telephone, pager (voice or text), e-mail, Internet or other media.

Systems for tracking assets are also well known. For example, U.S. Pat. No. 8,531,294 to Slavin et al. discloses a moving asset location tracking system that may include a mobile device application that enables a user to observe and provide alerts related to the location of assets, e.g., car, trailer, motorcycle, boat, all-terrain vehicle (ATV), tractor, kid's backpack, grandma's purse, etc. The system of Slavin et al. may include a data feed from a security/sensor network installed in a fixed location, such as a home or business, and location data provided by moving assets for tracking, reporting and alerting.

However, the systems of Zimmers et al. and Slavin et al. are tailored for specific uses and do not lend themselves to more general processing of input or sensor data against business rules for generating one or more output notifications when such notifications are warranted.

Accordingly, it would be highly advantageous to provide an intelligent notification system configured for receiving and processing any suitable input message, determining whether or not an output notification should be sent and for sending such output notifications with the appropriate information to the appropriate parties according to predetermined business rules. A method for intelligent notification is also desirable.

SUMMARY OF THE INVENTION

An embodiment of a method for intelligent notification is disclosed. The method may include receiving an input message from a client. The method may further include parsing the message for message contents, the message contents, comprising: sender, recipient, event description, time of event and date of event. The method may include analyzing the message contents based on preselected business rules established by the client. The method may include determining whether an output notification should be sent based on the analysis of the message contents and the business rules established by the client. The method may include sending an output notification to at least one preselected recipient specified by the client, if so directed by the business rules established by the client.

An embodiment of an intelligent notification system is disclosed. The system may include a web server for receiving an input message from an Internet. The system may further include a database server in communication with the web server. The database server may be configured for storing and retrieving client contact lists and client business rules. The system may further include a communications server in communication with the web server and the database server. The communications server may be configured to generate and send output notifications according to the client contact lists and client business rules.

Additional features and advantages of the invention will be set forth in the description which follows, and in part will be apparent from the description, or may be learned by the practice of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

There are many contexts where it would be desirable to have an automated system that can process one or more inputs and provide an automated response in the form of one or more outputs. Generally speaking an input is any data acquired by the system which may or may not be the result of a process that pulls or extracts data. Since the embodiments of the intelligent notification system disclosed herein is computer based, the inputs and outputs generally comprise digital content conveyed over an Internet Protocol (IP) based network, e.g., the Internet. Thus, inputs can be essentially anything that can be described or measured and sent over the Internet. A non-exhaustive list of examples of inputs to such a system may include sensor or equipment outputs, email, phone calls (e.g., conventional telephone calls, voice over IP, or VoIP), web site, supervisory control and data acquisition (SCADA) systems, really simple syndication (RSS) feeds, public safety messages, and scheduled polling of systems or equipment.

Figure 1:
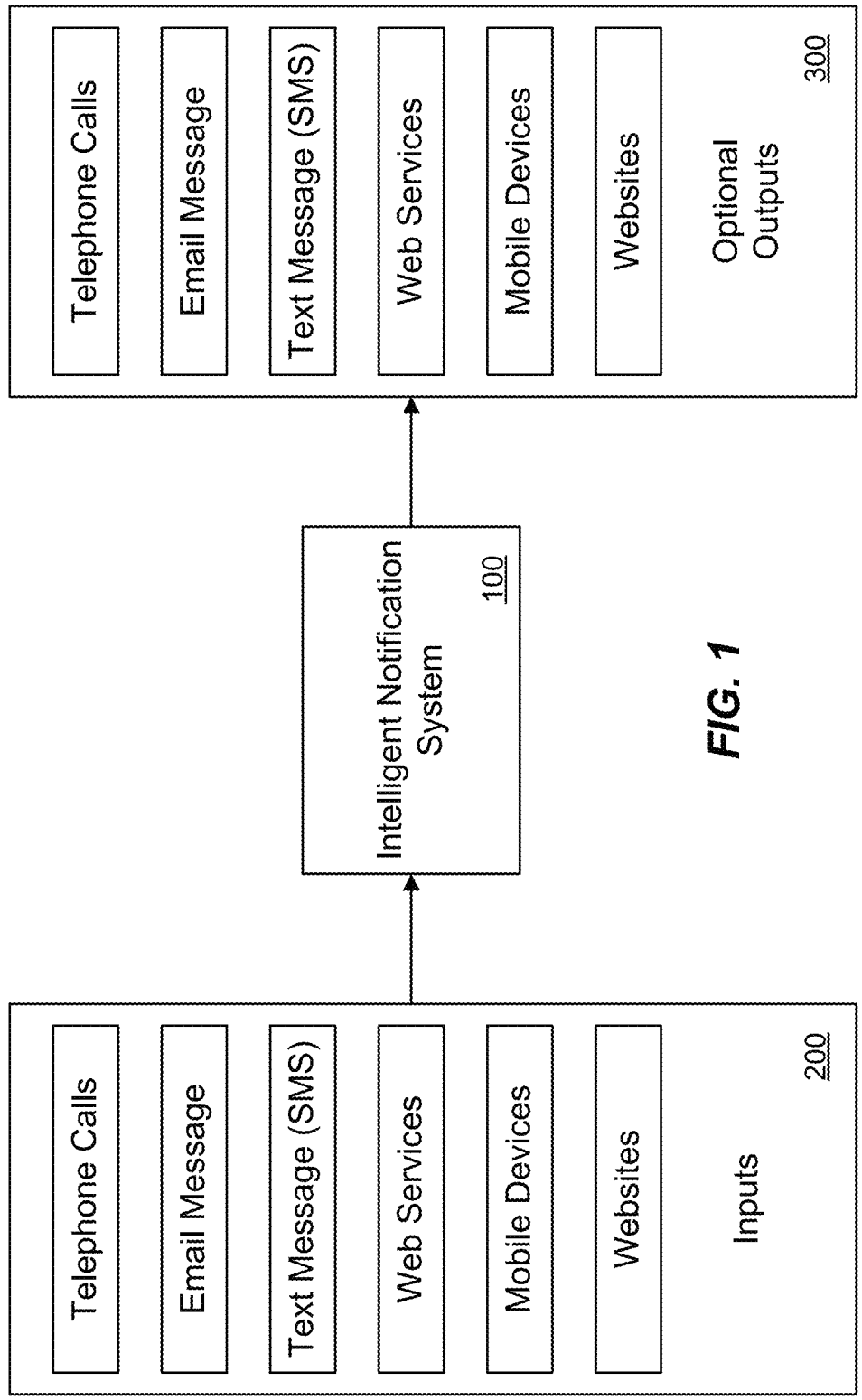
FIG. 1 is high-level block diagram of an embodiment of the intelligent notification system of the present invention.

FIG. 1 is a high-level block diagram of an embodiment of the intelligent notification system 100 of the present invention. As shown in FIG. 1, the inputs 200 may come from any suitable source, for example and not by way of limitation, telephone calls, email message, text message (short message service (SMS)), web services, mobile devices (smartphones, tablets, laptop computer, netbook computer, etc.), and web-sites. These inputs 200 are processed by the intelligent notification system 100 which may take action in the form of any one or multiple optional outputs 300, which may include any or all of the same types of inputs 200 listed above. The term "web service" as used herein is a vehicle through which different computer systems can exchange information using an agreed upon format. The terms "input" and "input" message" are used synonymously herein. Additionally, the terms "output", "output notification" and "notification" are used synonymously herein.

As previously noted the inputs 200 to a particular embodiment of an intelligent notification system 100 can be any type of input as described above. The following is a non-exhaustive exemplary list of actual input data that could be applied to various embodiments of system 100:

employees using telephones to report emergencies to response teams, global positioning system (GPS) tracking solution sending device information via email, mining company initiating a recall using web site, in-vehicle panic button sending data via web services (via satellite), bear traps sending trap status via email, power management solutions sending amp/volt/watt info via email, Android® and iPhone® mobile apps sending event data using web site, law enforcement kiosk sending data over web service, device/equipment status being polled by application via a schedule, camera systems sending images and event data by web service, and local equipment activity information being made global.

In a general embodiment of an intelligent notification system 100, a single type of input 200 may result in no output 300, one type of output 300, a few types of output 300, or many types of output 300. Additionally, such a general embodiment of an intelligent notification system 100 may receive and process a few, or many, inputs 200 and thereby generate no output 300, one type of output 300, a few types of output 300, or many types of output 300. The optional outputs 300 generated by the intelligent notification system 100 are dictated by particular business rules for a particular client of the intelligent notification system 100.

Processing, according to an embodiment of the intelligent notification system 100 of the present invention, may include the monitoring of various inputs as described above, analysis of that input data and action to be taken, or not taken, based upon predefined criteria or business rules. Thus, processing may include detecting whether such monitored inputs fall within or outside a business rule predefined for a customer or client. If the detected input breaks a predefined rule, then an alert is immediately transmitted to those tasked with responding to a known problem. Depending upon the nature of the input, authentication and analysis may or may not be part of the processing performed. However, the determination of what action to take, based upon the input, is consistent in every implementation. Once authentication is complete, if required, the input is analyzed, if required, to evaluate the content of the input data in relation to acceptable, or actionable values defined by the customer and referred to herein as business rules. If the evaluation of content results in action required, the intelligent notification system then generates the appropriate output(s), e.g., persons or agencies designated with responding to the problem are contacted with the appropriate information about the problem. Otherwise, no action is taken if the input data is found to be acceptable when compared to the business rules.

Figure 2:
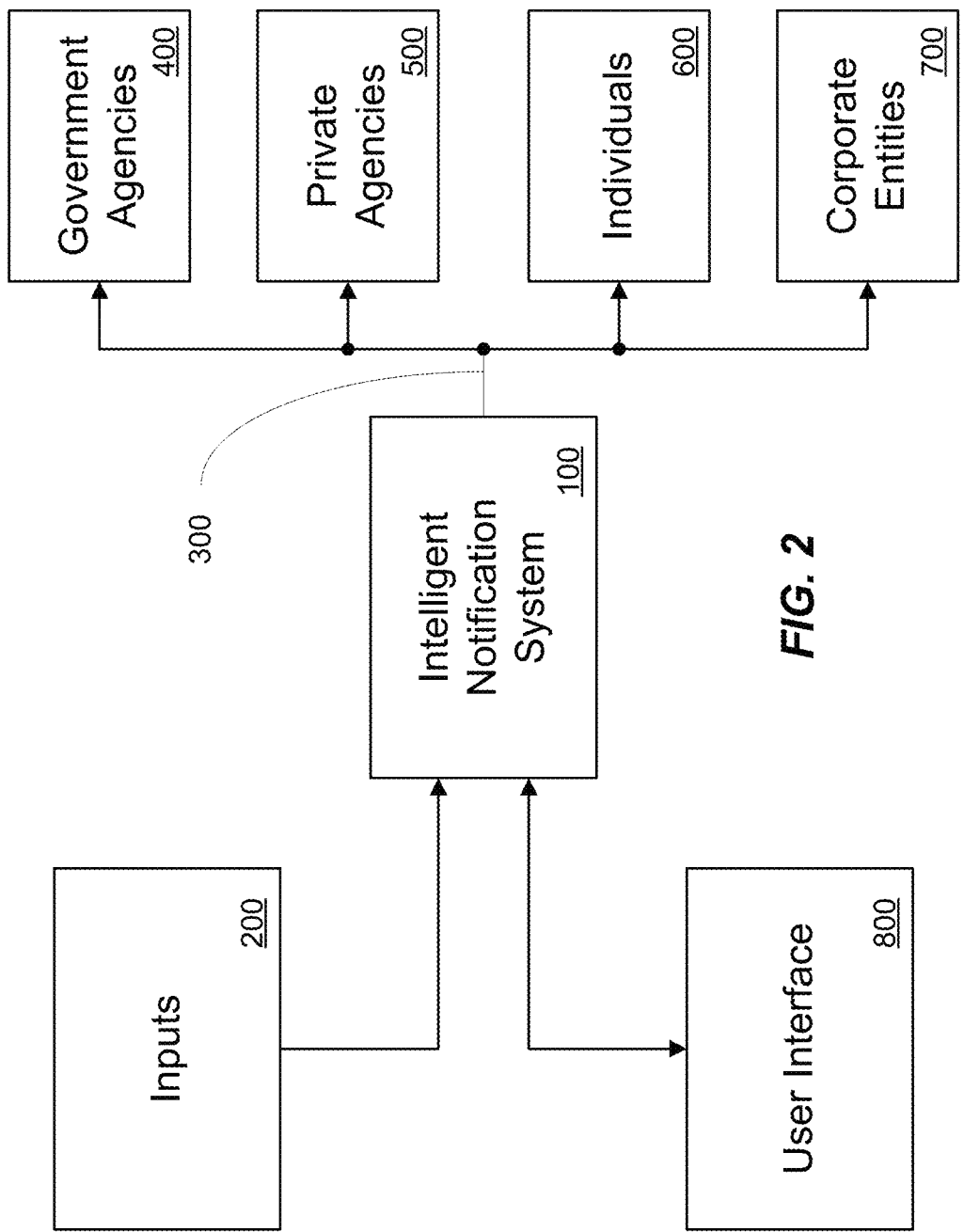
FIG. 2 is a block diagram illustrating various entities that may interact with the intelligent notification system of the present invention.

FIG. 2 is a block diagram illustrating various entities that may interact with the intelligent notification system 100 of the present invention. Inputs 200 of any suitable type may feed into the intelligent notification system 100 as also shown in FIG. 1. The optional outputs 300 may be notifications of any of the various types described herein that are directed to government agencies 400, e.g., police, fire department, paramedics, political offices, etc. Alternatively, the optional outputs 300 may be notifications directed to private agencies 500, e.g., private security companies or agencies. Often it is desirable to direct a notification to one or more individuals 600 or corporate entities 700. According to at least one embodiment of the present invention, a user interface 800 provides access to configure various aspects of the intelligent notification system 100, for example and not by way of limitation, web server, database server, communications server and/or other components that may be used to implement the client accounts, access credentials, business rules and other features of the intelligent notification system 100.

EXEMPLARY APPLICATION—1

The following is an exemplary application of the intelligent notification system 100 of the present invention that provides additional description of how the system works. The following example also demonstrates usefulness of the invention. Company A provides monitoring of individuals in the criminal justice system, e.g., individuals out on parole, or awaiting trial. Company A attaches an ankle bracelet to these individuals, and this bracelet communicates wirelessly with a unit installed in the individual's home. The unit installed in the individual's home in turn communicates wirelessly with Company A's data center. When away from home the ankle bracelet uses cellular communication to relay information (e.g., GPS location) to the data center.

Company A's data center keeps track of where an individual is located, based upon their current gps location. Company A's data center also uses virtual landmarks, or "geofences", to identify areas of interest relative to each particular individual (place of work, home address, etc.) Company A's data center detects events when a particular individual is somewhere they are not supposed to be, or conversely, when they are absent from somewhere they are supposed to be.

Upon detecting an event, Company A sends an email to a preselected email account, an email account associated with Company A as a client, within the intelligent notification system of the present invention. Though this example uses an "email" as the input, it will be understood that any suitable input may be used according to the principles and methods described herein. This event email forms an input into the intelligent notification system. An event email from Company A will typically include a number of pieces of data, e.g., the name of an individual being monitored by Company A, "to" and "from" address information, a descriptor for the particular offense detected, time of the offense, location of the offense, etc.

When the event email arrives at the intelligent notification system, it is parsed to extract the various contents of the email and to verify several things before further processing is conducted. For example, is the "from" address accurate and associated with a client (in this case, Company A) of the intelligent notification system? Is the "to" address a preconfigured email address associated and configured for Company A? Is the named individual found in the email the name of someone for which Company A has specified support in their business rules? Is the offense something supported according to the business rules? What is the time of the event? Where did the event take place? Thus, during parsing of the event email received from Company A, every valuable piece of information is extracted and then analyzed in light of Company A's business rules that dictate what the intelligent notification system is supposed to do with that information.

The following is an example of the Company A implementation, upon receiving an email. The first processing performed is to determine whether or not the email is from a legitimate client of the intelligent notification system. As noted above, the email can be certified by analyzing the "from" address and the "to" address in the email message. These two pieces of information must match a legitimate client of the intelligent notification system for any further processing. Let's assume it is a valid email that reveals the following information: from the Court in Bend, Oreg., which was sent to Company A's preconfigured email address within the intelligent notification system, the body or title of the message concerning an offender by the name of Brad Simpson, in the location of his ex-girlfriend's home, at 2:15 AM on a Sunday morning (date and time information). Company A has preconfigured business rules stored within a database within the intelligent notification system indicating this particular location of the offender is an "exclusion zone" violation, meaning he is not supposed to be there.

Company A's preconfigured business rules further define what action should be taken when such an "exclusion zone" violation occurs with this particular offender. The intelligent notification system evaluates what particular action Company A has prescribed for Brad Simpson in the event of an exclusion zone violation for this location, on this day, at this time. In this particular instance, the output from the intelligent notification system is telephone calls to: (1) the local 911 Dispatch Office, (2) his parole officer, (3) the victim (ex-girlfriend), (4) the victim's father, and (5) the victim's next door neighbor. Company A's business rules further dictate that each of these individuals or offices will receive up to five telephone call attempts (fewer, if the party contacted acknowledges the call). Further, if the 911 office cannot "acknowledge" the call, the intelligent notification system will fail-over to calling the sheriff's cell phone. So, in this particular example, these notifications form the output of the intelligent notification system.

The above exemplary embodiment used an incoming email message as an input to the intelligent notification system. However, for other embodiments the input could change, say from an email to a web service, and the output could change, say from phone calls to text messages and a public announcement (PA) system announcement. Thus, embodiments of the intelligent notification system may be configured to process most any suitable input, and upon processing deliver most any suitable output notification.

Figure 3:
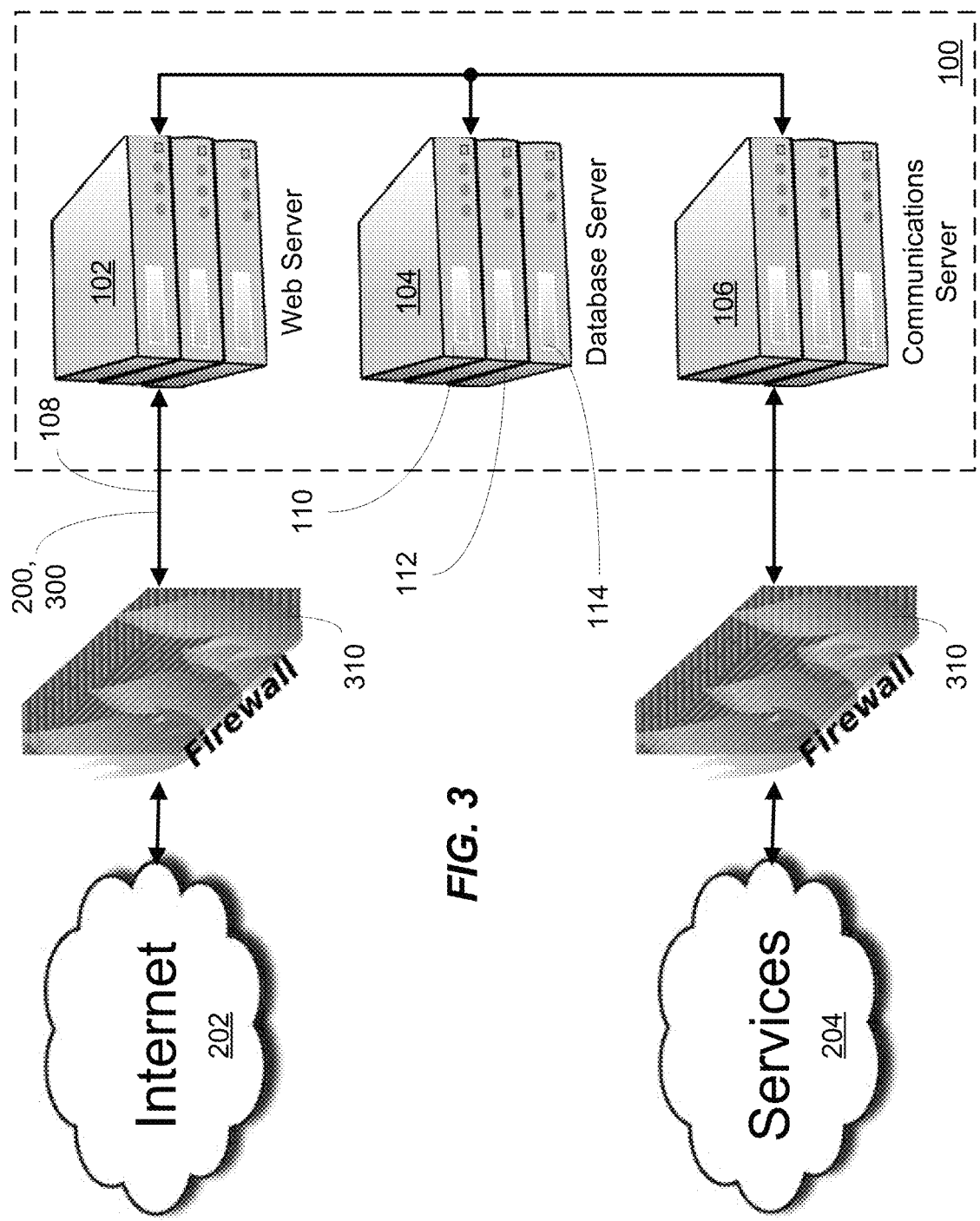
FIG. 3 is a block diagram illustrating the physical structure of an embodiment of the intelligent notification system.

FIG. 3 is a block diagram illustrating the physical structure of an embodiment of an intelligent notification system 100. Inputs (100, FIG. 1) may come from the Internet 202 and pass through optional firewall 310, for increased security and verification and certification of the inputs 200. Once through the optional firewall 310, inputs may be received at a web server 102 within the intelligent notification system 100. The web server 102 and/or database server 104 may include one or more computer programs (stored in memory, not shown) for parsing the input 200 received from the Internet 202 and other input conditioning prior to interfacing, or concurrent, with one or more database servers 104 (one shown in FIG. 3). The database server 104 may additionally be used to store and retrieve the parsed input message contents 110, client contact lists 112 and also to store and retrieve the business rules 114 for each client served by the intelligent notification system 100, according to various embodiments. If action is deemed necessary, based on the parsed input information and instructions dictated by the particular client business rules, one or more outputs 300 (FIG. 1) may be generated and sent via communications server 106 via the web server 102.

Another firewall 310 may separate the communications server 106 of the intelligent notification system 100 from pointing to and communicating with third party web sites or services 204 that may be utilized by system 100 during analysis of the input and processing according to the client business rules. Such third party services 204 may include telephony services for receiving and sending telephone calls, text messaging services for receiving and sending text messages, and any other communications service, including receiving and sending email, according to various embodiments.

One exemplary third party service 204 provides telephony services, whether receiving phone calls from the client, or sending phone calls to a given client of the intelligent notification system 100. Such telephony services may include interactive voice response (IVR) menus to provide feedback, determine acknowledgement, allow the client to search a database, etc. Exemplary third party telephony services would be those provided by companies like Twilio, Inc., San Francisco, Calif., Tropo, Inc., Menlo Park, Calif., or Voxeo Corporation, Orlando, Fla. Such telephony services allow the recording and storage of audio files (conversations) for subsequent processing by an embodiment of intelligent notification system 100, including retransmission of audio for output notifications 300.

One exemplary third party service 204 provides texting (SMS) service. Again, this service would be used to receive texts from, or send texts to, clients of the intelligent notification system 100. An exemplary third party SMS service could be provided by mBlox, Inc., Sunnyvale, Calif. Such third party texting services provide a mechanism for receiving replies from delivered messages, considered as an input 200, especially when communicating with sensors or equipment belonging to a client.

According to still further embodiments of the intelligent notification system 100, Facebook® or Twitter® may also provide third party services 204 for communications that fall uniquely within their respective communications mediums for inputs 200 and output notifications 300 according to still further embodiments.

According to yet further embodiments of the intelligent notification system 100, third party services 204 may include speech-to-text services for receiving speech from a phone call or audio file as an input 200 and transmitting an output notification in the form of a text document which upon processing may be delivered as a text message, email message or webpage report, as desired. In this particular example the client will send an audio file via third party telephony (meaning, they will call a phone number and leave a recorded message). An embodiment of the intelligent notification system 100 can then send the audio to a third party audio transcription service and they will return a text document. The text document can then be parsed for content as described herein as well as made available through a webpage report, or text message, or email to designated recipients according to a particular client's business rules.

Third party services 204 not strictly tied to communications may include a video analytics service, in which a client may send a raw video feed as an input 200 for processing through an analytics engine with the intelligent notification system 100 in order to provide useful information on what may be happening in the video, and consequently useful output notifications 300.

Note that FIG. 3 illustrates a simplified implementation of the intelligent notification system 100. The physical structure may vary depending upon the location where the intelligent notification system 100 is installed, and could include additional scaling and robustness features like load balancers (not shown), duplicate servers for fail-over (not shown), geographic redundancy (not shown), placement into cloud environments (not shown), etc. Such additional features of a networked computer system and/or environment, and how to implement same, falls within the knowledge of one of ordinary skill in the art and, thus, will not be further described herein.

With additional reference to FIG. 1, "input" can be thought of as primarily acting upon the web server 102 portion of the structure shown in FIG. 3. The "processing" phase is best thought of as the communications server 104 and database server 106 working together, and the "output" tends to be more focused on the communications server 106 working together with the web server 102.

EXEMPLARY APPLICATION—2

The following is another exemplary application of the intelligent notification system 100 of the present invention that provides further description of using the system 100 and how it functions. Company B has a large manufacturing plant where they assemble tractors. To improve safety by rapid emergency response, Company B installed telephones on several support pillars around the manufacturing plant. When an event takes places, Company B employees are trained to use one of these "pillar phones" to contact response personnel. According to their training and emergency response protocols, Company B employees reporting an event use these pillar phones to speed dial a predefined phone number that is a preconfigured input 200 for Company B into the intelligent notification system 100. During such a phone call the Company B employees state their name, location, and nature of the event and the telephone message is recorded, along with the time and date by the intelligent notification system 100 as an input 200, ready for parsing. Here the relevant information parsed from the call is the Company B employee's name, location, and nature of the event.

Upon parsing the recorded phone message, the Employee's name, location and description of event are extracted by the intelligent notification system 100. According to Company B's business rules, the audio recording is then forwarded to approximately 50 personnel at Company B for further action. The audio recording becomes a notification that is played during phone calls, is made available as an audio file link via SMS, and as an audio file attachment to email, all according to Company B's business rules.

In this particular application, the processing performed by the intelligent notification system 100 is fairly simple, i.e., the time and day are evaluated and only those Company B personnel who are on-duty, as defined by their profiles within Company B's business rules stored within the intelligent notification system 100 are notified. As an added enhancement, the intelligent notification system 100 uses the caller-ID of the pillar phone to confirm or add location information within the notification. Occasionally, when an emergency arises, the caller may forget to mention which pillar they are calling from because of stress or panic during the emergency. As one might surmise, location information may be critical because without it, the large manufacturing plant contains a lot of ground to search for somebody needing immediate assistance.

So, in this particular example, a single phone call operates as the input 200, which triggers processing by the intelligent notification system 100, resulting in call recording, caller-ID evaluation and contact notification collection during the processing phase, and voice, SMS and email as the outputs 300 to various Company B personnel. Recall that exemplary application 1 relied upon an input email message as input 200. The following application demonstrates the use of web services as an input 200.

EXEMPLARY APPLICATION—3

Company C provides a sophisticated video surveillance system, combining long range (daylight or thermal) cameras with pan-tilt-zoom (PTZ) cameras for its customers. Any long range camera, upon detecting something out of place, directs a PTZ camera to zoom in on that spot. This focuses the video imagery on the anomaly. However, without further notification capability, Company C's system could only temporarily flag the event, but without any operator response would reset back to normal. So, if you happen to miss the event by not viewing the camera field of view when it became flagged, you would never have known it ever happened without further investigation.

When Company C detects an event, the images tied to the event (the long range camera image and the PTZ image) are delivered to the intelligent notification system 100. Included with the images is information regarding the camera name or ID, the location where the camera is located, time and date stamp of when the event was observed, etc. All of this input 200 information is passed to the intelligent notification system 100 by means of a web service. As noted above, a web service is an agreement between two computer systems on how to transfer information. The intelligent notification system 100 has a "method" that Company C's web server can invoke, passing along the various event details. So, the input 200 to the intelligent notification system 100 comes from a web service in this particular application.

Once received, the intelligent notification system 100 verifies the information provided (which includes account credentials). The information allows the intelligent notification system 100 to determine which agency (Company C) owns that camera, and based on Company C's predefined business rules, allows the intelligent notification system 100 to collect contact information of Company C personnel to be notified. This is the processing phase.

Once the list of contacts is built, the intelligent notification system 100 sends phone calls, text (SMS) messages and email with the details of the event including the images (attached to email, or linked via SMS). This forms the output 300 of the intelligent notification system 100 for this particular application.

This particular application of the intelligent notification system 100, includes providing a web portal (108 FIG. 3) to allow authorized Company C personnel to configure their profile information, manage cameras, set notification options and things of that nature by directly configuring Company C business rules within the intelligent notification system 100. Another useful aspect of this particular solution is that the outputs 300 may be time shifted if Company C so desires. For example, management often wants to be made aware of surveillance activity, but not necessarily to be notified as it happens (middle of the night, typically). To support this feature, the intelligent notification system 100 provides a "scheduled"

notification. For instance, every X time interval, as defined by the client, the intelligent notification system 100 can generate and send an email notification (output 300) of all activity processed during that time frame. So, for this feature, there is a timer monitoring the period of time until the next notification needs to be sent out.

EXEMPLARY APPLICATION—4

An additional variation on the above three exemplary applications of the intelligent notification system 100 will now be described. The web service input of exemplary application 3 is very similar to polling solutions, where the intelligent notification system 100 monitors remote systems or equipment. Every X time frame, the intelligent notification system 100 polls (contacts) the sensor, or device for current status. If everything is OK with the sensor or device being polled, a reply of some known value is returned. If the reply indicates a problem, the intelligent notification system 100 may begin output notifications 300 according to some particular business rules for that particular client.

Company D operates oil and gas pumps in the field. A pump in the oil field needs to be operating all the time to maximize profit. Every five minutes this embodiment of the intelligent notification system 100 is configured to invoke a web service method to communicate with that pump (via cell modem on the pump). If the pump replies with an "OK" code, no further action takes place until the pump status is polled again in another five minutes, when the process repeats itself. Alternatively, if the intelligent notification system 100 fails to get the "OK" code, system 100 notifies maintenance personnel that the pump needs servicing or other attention based on the returned code and Company D's business rules. It will be evident that various personnel at Company D may be notified depending on the code returned. Furthermore, such personnel can be notified by any suitable output 300 type.

Figure 4:
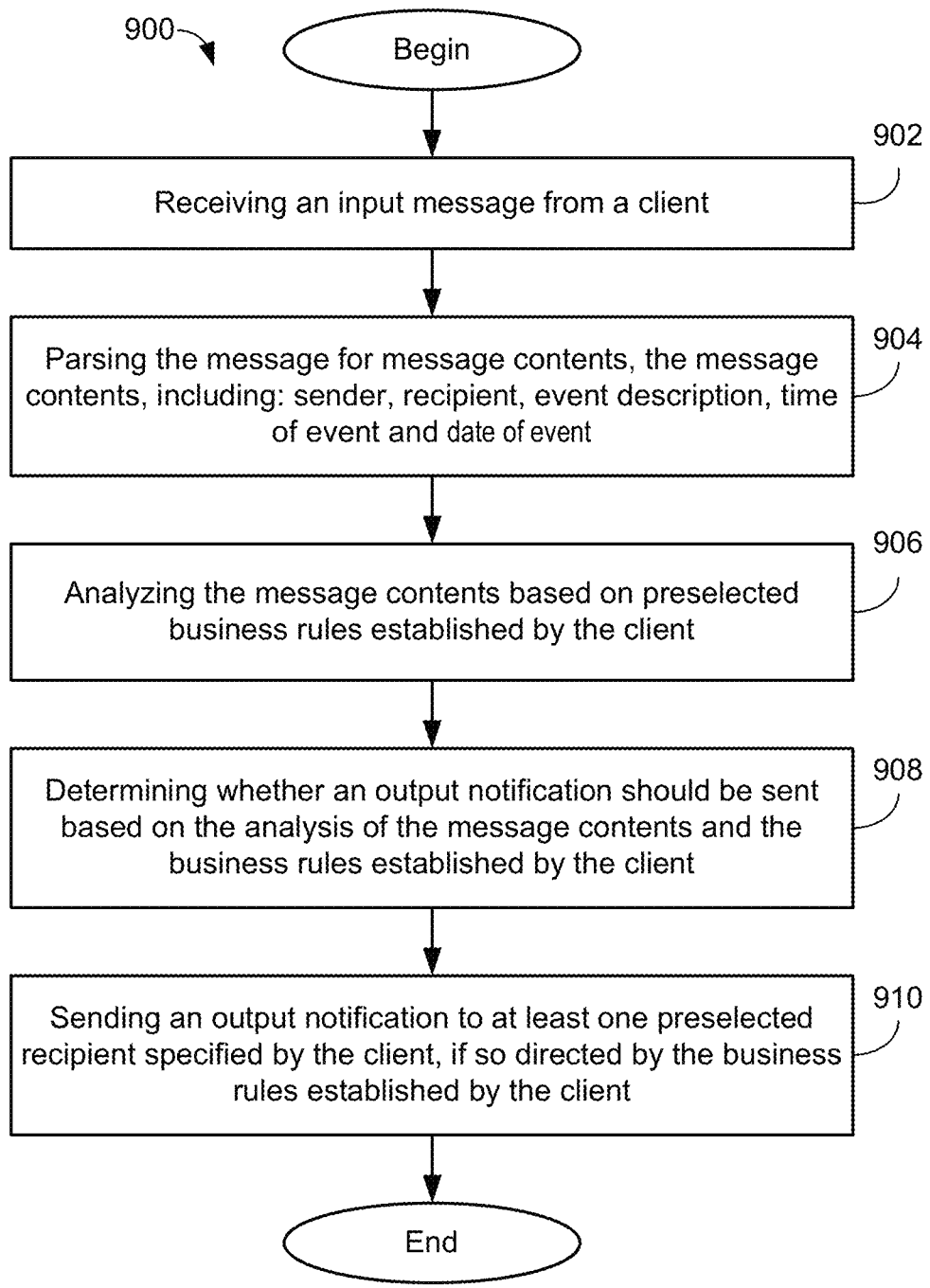
FIG. 4. is a flowchart of an embodiment of a method for intelligent notification, according to the present invention.

FIG. 4. is a flowchart of an embodiment of a method 900 for intelligent notification, according to the present invention. Method 900 may include receiving 902 an input message from a client. The input message may be of any suitable type disclosed herein or shown in FIG. 1. Method 900 may further include parsing 904 the message for message contents, the message contents, comprising at minimum: sender, recipient, event description, time of event and date of event. Additional message content as described herein may also be included according to other embodiments of method 900. Method 900 may further include analyzing 906 the message contents based on preselected business rules established by the client. The preselected business rules allow the client to configure when and if an output notification is to be sent as well as who will receive such an output notification, how many attempts to deliver the output notification and any fail-over processing that should occur, as described herein. Method 900 may further include determining 908 whether an output notification should be sent based on the analysis of the message contents and the business rules established by the client. Finally, method 900 may further include sending 910 an output notification to at least one preselected recipient specified by the client, if so directed by the business rules established by the client.

According to another embodiment of method 900, the input message type may be selected from the following non-exhaustive list: telephone call, email message, text message, web services, mobile device, and website. Of course any suitable input message type that is capable of transmitting information such as sender, recipient, event description, time of event and date of event, could be an input for an embodiment of system 100 and another embodiment of method 900. Similarly, in yet another embodiment of method 900, the output notification type may be selected from the same non-exhaustive list, i.e., telephone call, email message, text message, web service, mobile device, and website. The output notification type will be dictated by the preselected business rules of the client.

According to still another embodiment of method 900, the business rules established by the client may be configurable by the client via a web portal. According to one embodiment of method 900, the output notification may be directed to multiple recipients. According to one embodiment of method 900, no output notification may be sent in response to an input according to the preselected business rules established by the client. According to yet another embodiment of method 900, the output notification may be directed to at least one of: a government agency, a private agency, an individual and a corporate entity. See for example, FIG. 2, and related description above.

An embodiment of an intelligent notification system 100 is disclosed. For example, see intelligent notification system 100 as shown in FIG. 3 and described above. System 100 may include a web server 102 for receiving an input message 200 from an Internet 202. System 100 may further include a database server 104 in communication with the web server 102. The database server 104 may be configured for storing and retrieving client contact lists 112 and client business rules 114. The system may further include a communications server 106 in communication with the web server 102 and the database server 104. The communications server may be configured to generate and send output notifications according to the client contact lists and client business rules.

According to one embodiment, system 100 may further include a firewall 310 between the intelligent notification system 100 and the Internet 202, see, e.g., FIG. 3 and related discussion above. According to another embodiment of system 100, the input message type may be selected from the following list of message types: telephone call, email message, text message, web services, mobile device, and website. Similarly, according to yet another embodiment of system 100, the output notification type may be selected from the same list of message types, i.e., telephone call, email message, text message, web service, mobile device, and website.

According to another embodiment of system 100, the output notification may be sent to at least one recipient. According to yet another embodiment of system 100, the output notification may be sent to multiple recipients. According to still another embodiment of system 100, the output notification may be sent repeatedly until acknowledged by at least one recipient.

According to one embodiment, system 100 may further include third party services in communication with the communications server, the third party services providing external processing of the input message and at least one output notification. According to another embodiment of system 100, the third party services may include telephony services for receiving telephone messages, recording the messages as audio files and retransmitting the audio files. According to yet another embodiment of system 100, the third party services may include texting services for receiving acknowledgements in the form of text messages in response to delivered polling messages sent to sensors or equipment. For example, in the context of polling equipment or sensors for status, it is necessary to deliver a polling message to the equipment or sensor being polled. In response to the message, the equipment or sensor may reply with status in a text message.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A method for intelligent notification, comprising:
    providing a web server for receiving input messages having an input message type from a client;
    providing a database server in communication with the web server, the database server configured for storing and retrieving client contact lists and client business rules;
    providing a communications server in communication with the web server and the database server, the communications server configured to generate and send at least one output notification to a recipient on the client contact lists according to the client business rules;
    the web server receiving an input message from a client;
    the web server parsing the message for message contents, the message contents, comprising:
        sender;
        recipient;
        event description;
        time of event; and
        date of event;
    the web server authenticating the input message to determine when the sender is accurate and associated with the client and whether the recipient is associated and configured for the client;
    the database server analyzing the message contents based on the client business rules;
    the database server determining whether an output notification will be sent or not to select clients in the client contact lists based on the analysis of the message contents and the client business rules; and
    the communications server sending the output notification having an output notification type to the select clients in the client contact lists according to the client business rules.

2. The method according to claim 1, wherein the input message type is selected from the group consisting of: telephone call, email message, text message, web services, mobile device, and website.

3. The method according to claim 1, wherein the output notification type is selected from the group consisting of: telephone call, email message, text message, web service, mobile device, and website.

4. The method according to claim 1, wherein the client business rules are established by the client and are configurable by the client via a web portal.

5. The method according to claim 1, wherein the output notification is directed to multiple recipients in the client contact lists.

6. The method according to claim 1, wherein no output notification is sent in response to the input message according to the client business rules.

7. The method according to claim 1, wherein the output notification is directed to at least one of: government agency, private agency, individual and corporate entity.

8. An intelligent notification system, comprising:
    a web server for receiving an input message from an Internet, the input message having an input message type, the web server further authenticating the input message to determine when the input message was sent by a client to a known recipient associated and configured for the client, the web server further configured for parsing the message for message contents, the message contents, comprising:
        sender;
        recipient;
        event description;
        time of event; and
        date of event;
    a database server in communication with the web server, the database server configured for storing and retrieving client contact lists and client business rules, the database server further configured for determining whether an output notification will be sent or not to select clients in the client contact lists based on the analysis of the message contents in accordance with the client business rules; and
    a communications server in communication with the web server and the database server, the communications server configured to generate and send an output notification having an output notification type to a recipient on the client contact lists according to the client business rules.

9. The system according to claim 8, further comprising a firewall between the intelligent notification system and the Internet.

10. The system according to claim 8, wherein the input message type is selected from the group consisting of: telephone call, email message, text message, web services, mobile device, and website.

11. The system according to claim 8, wherein the output notification type is selected from the group consisting of: telephone call, email message, text message, web service, mobile device, and website.

12. The system according to claim 8, wherein the output notification is sent to at least one recipient.

13. The system according to claim 8, wherein the output notification is sent to multiple recipients.

14. The system according to claim 8, wherein the output notification is sent repeatedly until acknowledged by at least one recipient.

15. The system according to claim 8, further comprising third party services in communication with the communications server, the third party services providing external processing of the input message and the output notification.

16. The system according to claim 15, wherein third party services comprises telephony services for receiving telephone type input messages, recording the messages as audio files and retransmitting the audio files as output notifications.

17. The system according to claim 15, wherein third party services comprises texting services for receiving acknowledgements in the form of text messages in response to delivered polling messages sent to polled equipment or sensors.

18. A method for intelligent notification, comprising:
providing a web server for receiving input messages from a client;
providing a database server in communication with the web server, the database server configured for storing and retrieving client contact lists and client business rules;
providing a communications server in communication with the web server and the database server, the communications server configured to generate and send at least one output notification to a recipient on the client contact lists according to the client business rules;
the web server receiving an input message from a client;
the web server parsing the message for message contents, the message contents, consisting of:
sender;
recipient;
event description;
time of event; and
date of event;
the web server authenticating the input message to determine when the sender is accurate and associated with the client and whether the recipient is associated and configured for the client;
the database server analyzing the message contents based on the client business rules;
the database server determining whether an output notification will be sent or not to select clients in the client contact lists based on the analysis of the message contents and the client business rules; and
the communications server sending the output notification to the select clients in the client contact lists according to the client business rules.

19. The method according to claim 18, wherein the client business rules are established by the client and are configurable by the client via a web portal.

20. The method according to claim 18, wherein no output notification is sent in response to the input message according to the client business rules.

* * * * *